United States Patent Office 3,674,639
Patented July 4, 1972

3,674,639
METHOD OF PRODUCING L-GLUTAMIC ACID BY FERMENTATION
Shigeho Ikeda, Tokyo, and Ayaaki Ishizaki, Yoshio Hirose, and Teruo Shiro, Kanagawa-ken, Japan, assignors to Ajinomoto Co., Inc., and Sanraku Ocean Co., Ltd., Tokyo, Japan
No Drawing. Filed May 18, 1970, Ser. No. 38,534
Claims priority, application Japan, May 27, 1969, 44/41,117
Int. Cl. C12d 1/00
U.S. Cl. 195—28 R                    9 Claims

ABSTRACT OF THE DISCLOSURE

Artificially induced mutants of the glutamic acid producing microorganisms *Brevibacterium ketoglutamicum*, *Corynebacterium hydrocarboclastus*, and *Arthrobacter paraffineus* which are capable of growing on an agar medium containing substances having penicillin activity in an amount corresponding to more than 5 international or U.S.P. penicillin units per milliliter have been found capable of assimilating hydrocarbons and their oxidation products as the principal source of carbon from a nutrient medium containing penicillin-active substances in high concentrations, and to convert the assimilated material to L-glutamic acid relatively rapidly until concentrations of more than 7 g./dl. are reached in the medium.

---

This invention relates to the production of L-glutamic acid by fermentation, and particularly to a method of producing L-glutamic acid by fermentation from a nutrient containing hydrocarbons or the products of their partial oxidation as principal carbon sources.

It was known heretofore that certain naturally occurring microorganisms are capable of assimilating hydrocarbons and of producing extracellular amino acids, including L-glutamic acid, hereinafter referred to as "glutamic acid," in the culture medium employed. It was also known that small amounts of penicillin in the culture medium may increase the yield of glutamic acid. However, the yields available from the known microorganisms were low, and the fermentation periods required were long.

While penicillin present in a culture medium promotes the conversion of hydrocarbons consumed by the known microorganisms to glutamic acid, it interferes with assimilation of the hydrocarbons by the microorganisms and causes a decline in the rate at which the hydrocarbons are consumed in the later stages of the fermentation process.

It has now been found that certain artificially induced mutants of microorganisms known to be capable of producing glutamic acid from hydrocarbons are superior to the parent strains in their ability of assimilating hydrocarbons at a high rate even in the presence of penicillin.

The mutants suitable for the method of this invention have been produced by exposing parent strains of Brevibacterium, Corynebacterium, and Arthrobacter to ionizing radiation or to mutagenic chemical agents in a manner conventional in itself, and by screening the exposed microorganisms for their resistance to substances having penicillin activity. Such penicillin resistant mutants have been obtained from *Brevibacterium ketoglutamicum*, *Corynebacterium hydrocarboclastus*, and *Arthrobacter paraffineus* by selecting mutant strains capable of growing on a conventional agar nutrient medium which contained penicillin active material in a concentration of more than 5, and preferably more than 10 international or U.S.P. penicillin units per milliliter.

The most effective strains found so far are

*Brevibacterium ketoglutamicum* S–10 (ATCC 21533)
*Corynebacterium hydrocarboclastus* R–7 S–15 (ATCC 21534)
*Arthrobacter paraffineus* S–4 (ATCC 21535)

Specimen cultures of these microorganisms are available to qualified persons without our permission from the American Type Culture Collection, Washington, D.C., under the accession numbers listed above.

Penicillin G, its salts, and other members of the penicillin group having penicillin activity are added to the fermentation medium in an amount sufficient to inhibit the growth of the microorganisms, and the optimum concentration of penicillin active material is between 50 and 500 units per milliliter of the nutrient medium, but varies from one microorganism to the other. Benzylpenicillin, $\alpha$ - phenoxyethylpenicillin, phenoxymethylpenicillin, $\alpha$-phenoxypropylpenicillin, 5-methyl-3-phenyl-4-isoxazolyl-penicillin, $\alpha$-aminobenzylpenicillin, and other so-called synthetic penicillins and their sodium, potassium, and calcium salts may be employed instead of the natural product. The penicillin active material should be added to the culture medium before the microbial growth reaches its maximum, but need not be present initially.

The culture media employed by this invention are otherwise conventional. They contain hydrocarbons or their products of partial oxidation as primary or principal carbon sources, conventional nitrogen sources, optional minor or secondary carbon sources, and the usual minor organic nutrients and inorganic salts which promote microbial growth.

While pure alkanes having straight carbon chains of six to twenty carbons are each capable of providing assimilable carbon, their crude or partly refined natural mixtures with related compounds are equally effective and more economical. Crude petroleum, refined petroleum fractions, and by-products and distillation residues of petroleum refining may thus be used, as is known in itself. They may be in the gaseous, liquid, semisolid, or solid state. The products of industrial catalytic oxidation of such hydrocarbons which mainly consist of alcohols, monocarboxylic and dicarboxylic acids having carbon chains of approximately the same length as the alkanes mentioned above are also useful carbon sources. For reasons of economy and convenience of operation, kerosene, naphtha, light oil, heavy oil, and ligroin are preferred carbon sources.

Suitable nitrogen sources include gaseous ammonia, aqueous ammonium hydroxide solution, ammonium salts of organic and inorganic acids, urea, and other nitrogen-containing organic and inorganic compounds. Higher yields of glutamic acid are generally obtained in the presence of small amounts of organic nutrients, such as vitamins and amino acids which may be supplied in the form of yeast extract, corn steep liquor, peptone, meat extracts, or protein hydrolyzate.

The fermentation is best carried out at temperatures between 24° and 40° C. in a medium having a pH between 6 and 9 and under aerobic conditions maintained by agitation and/or aeration, the air employed being preferably enriched with oxygen. Under these conditions, conventional in themselves, very satisfactory yields of glutamic acid can be achieved in cultivation periods of only 3 to 4 days. Glutamic acid accumulates to concentrations of 7 g./dl. and more and is recovered by the methods commonly used in the art. The broth may be filtered to remove microbial cells, the filtrate partly evaporated, and L-glutamic acid crystallized from the concentrate by cooling and pH adjustment. Glutamic acid may also be recovered from the broth by adsorption on a suitable ion exchange resin, elution, and crystallization from the partly evaporated eluate.

The following examples are further illustrative of this invention, but it will be understood that the invention is not limited thereto.

EXAMPLE 1

A seed culture medium was prepared to contain, per deciliter, 1 g. suberic acid, 2 g. $(NH_4)_2HPO_4$, 50 mg. $MgSO_4 \cdot 7H_2O$, 0.5 g. $KHPO_4$, 1 mg. each of $FeSO_4 \cdot 7H_2O$ and $MnSO_4 \cdot 7H_2O$, 10 mg. $ZnSO_4 \cdot 7H_2O$, 0.2 g. yeast extract, and 100 γ thiamine hydrochloride, and adjusted to pH 6.75. 20 ml. batches of the sterilized medium in 500 ml. shaking flasks were inoculated and *Corynebacterium hydrocarboclastus* R–7 S–15 and with the parent strain *Corynebacterium hydrocarboclastus* R–7 respectively, and cultured at 31.5° C. with shaking for 24 hours.

A fermentation medium which differed from the seed culture medium by the absence of the suberic acid and the ammonium phosphate, but contained instead 10 g./dl. n-hexadecane was prepared, and 300 ml. batches of the sterilized fermentation medium were inoculated with 15 ml. portions of the seed cultures in 1000 ml. fermentation vessels.

The fermentation was carried out under aerobic conditions with agitation at 1500 r.p.m. while a sterile mixture of 40% oxygen and 60% nitrogen was bubbled through each medium. Enough gaseous ammonia was supplied to keep the pH at 6.75. Equal growth stages were reached by *C. hydrocarboclastus* R–7 S–15 in 16 hours, and by *C. hydrocarboclastus* R–7 after 24 hours, whereupon penicillin G potassium was added to the several vessels in the amounts indicated in Table 1. The fermentation was continued for four days, and the glutamic acid accumulated in each fermentation broth was determined. The results are also shown in Table 1.

TABLE 1

| Added penicillin, units/ml. | L-glutamic acid in broth, g./dl. | |
|---|---|---|
| | R–7 | R–7 S–15 |
| 0 | 0.22 | 0.63 |
| 20 | 2.32 | 5.18 |
| 100 | 2.18 | 7.45 |
| 200 | 2.10 | 7.58 |
| 500 | 1.94 | 5.74 |
| 1,000 | 1.96 | 4.81 |

EXAMPLE 2

The fermentation described in Example 1 was repeated with the amounts of penicillin G potassium which had produced a maximum of glutamic acid, that is, 20 u./ml. for R–7, and 100 u./ml. for R–7 S–15. The residual n-hexadecane, in g./dl., the oxygen absorption rate in $10^{-7}$ mole/min. ml., and the glutamic acid concentration in g./dl. were measured or calculated intialy, and after 8, 24, 32, 48, 72, and 96 hours. Penicillin was added to each medium 18 hours after inoculation. The results are shown in Table 2.

TABLE 2

| Fermentation time, hrs | 0 | 8 | 24 | 32 | 48 | 72 | 96 |
|---|---|---|---|---|---|---|---|
| R–7: | | | | | | | |
| Hexadecane, g./dl | 10 | 9.74 | 8.65 | 6.24 | 5.49 | 5.11 | 5.00 |
| O-absorption rate | 0 | 1.37 | 1.80 | 4.52 | 2.58 | 0.67 | 0 |
| Glutamic acid, g./dl | 0 | 0 | 0.25 | 1.20 | 2.28 | 2.45 | 2.45 |
| R–7 S–15: | | | | | | | |
| Hexadecane, g./dl | 10 | 9.73 | 7.82 | 5.20 | 2.96 | 1.34 | 0.61 |
| O-absorption rate | 0 | 1.10 | 24.6 | 14.6 | 13.6 | 4.40 | 1.80 |
| Glutamic acid, g./dl | 0 | 0 | 0.50 | 2.51 | 4.43 | 6.48 | 7.20 |

Glutamic acid was recovered from the broth of *C. hydrocarboclastus* R–7 S–15 after removal of the microbial cells and partial evaporation by pH adjustment to 3.2 in the expected yield.

EXAMPLE 3

When the penicillin G potassium was replaced in the procedure of Example 1 with 20 u./ml. phenoxymethylpenicillin or α-phenoxyethylpenicillin added to cultures of *C. hydrocarboclastus* R–7, and the same penicillin active compounds were added to cultures of the mutant strain R–7 S–15 in amounts of 100 u./ml., the amounts of glutamic acid accumulated by R–7 were 2.14 and 1.96 g./dl. respectively, whereas R–7 S–15 produced 7.05 and 6.88 g./dl. glutamic acid, showing the closely corresponding effects of the several penicillins.

EXAMPLE 4

A fermentation medium was made up differing from that of Example 1 by replacement of the n-hexadecane with 1 g./dl. of a mixture of equal weights of the saturated five monocarboxylic acids having a straight chain of 14 to 18 carbon atoms. 300 ml. batches of the medium were inoculated with *C. hydrocarboclastus* R–7 and R–7 S–15, and 20 and 100 u./ml. penicillin G were added in a procedure closely similar to that of Example 1. A pH of 6.5 to 7.5 was maintained by additions of 4 $N-NH_4OH$ or 4 $N-H_2SO_4$ solution. The acid mixture was replenished as it was being consumed during fermentation, a total amount of 5 g./dl. being added. 0.98 g./dl. glutamic acid were found after the fermentation in the broth of R–7, and 2.24 g./dl. in the broth of R–7 S–15.

1.21 g./dl. glutamic acid and 2.45 g./dl. glutamic acid were found under otherwise unchanged conditions in the broths of R–7 and R–7 S–15 respectively when the monocarboxylic acids in the nutrient medium were replaced by the same amount of a mixture of the dicarboxylic acids having 5 to 10 carbon atoms in their straight carbon chains.

Closely corresponding results were obtained under analogous conditions with the use of a commercial product consisting essentially of a mixture of acids and alcohols having 5 to 20 carbon atoms and obtained by partial oxidation of the corresponding hydrocarbons.

EXAMPLE 5

*Corynebacterium hydrocarboclastus* R–7, the aforementioned mutant strain R–7 S–15, and another artificially induced mutant R–7 S–7 were cultured in media containing 1% yeast extract, 1% polypeptone, 0.5% NaCl, 2% agar, and the amounts of penicillin indicated in Table 3. They were also employed in a procedure corresponding to that of Example 1 with 20, 100, and 100 u./ml. penicillin respectively in the fermentation medium.

Table 3 lists the growth rates observed in the agar cultures at the several penicillin concentrations and the amounts of glutamic acid produced in the fermentation media.

The growth rates are indicated in Table 3 in a qualitative manner on a scale on which ++ stands for vigorous growth, + indicates mediocre growth, and − indicates the absence of detectable growth.

TABLE 3

| | Penicillin in agar medium, u/ml. | | | | Glutamic acid, g./dl. |
|---|---|---|---|---|---|
| | 0 | 10 | 20 | 30 | |
| R–7 | ++ | − | − | − | 2.24 |
| R–7 S–7 | ++ | ++ | ++ | − | 5.18 |
| R–7 S–15 | ++ | ++ | ++ | + | 7.42 |

The correlation between the penicillin resistance of the microorganisms and their ability of producing glutamic acid from hydrocarbons as a carbon source is evident from Table 3.

EXAMPLE 6

In a procedure analogous to that of Example 4, batches of a fermentation medium containing as a carbon source 6 g./dl. of a mixture of equal weights of the nine normal paraffins having 10 to 18 carbon atoms, but otherwise as described in Example 1, were inoculated respectively with *Corynebacterium hydrocarboclastus* R–7 and R–7 S–15, Penicillin was added to the media during the initial stages of fermentation twice in amounts of 20 u./ml., and after 16 hours in an amount of 80 u./ml.

After 96 hours of cultivation, the broth of *C. hydrocarboclastum* R–7 S–15 contained 3.62 g./dl., but no glutamic acid could be detected in the broth of strain R–7.

EXAMPLE 7

The procedure of Example 4 was generally followed with a fermentation medium containing 1 g./dl. suberic acid as the carbon source. Growth uninhibited by penicillin was permitted to proceed in the cultures of *Corynebacterium hydrocarboclastus* until a sample diluted with 25 volumes of water had an optical density of 0.500, whereupon 100 u./ml. and 20 u./ml. penicillin were added to the media respectively inoculated with R–7 S–15 and R–7. As the suberic acid was consumed, it was replenished by adding small amounts of a 20 g./dl. solution of ammonium suberate. Total additions, in terms of suberic acid, amounted to 5 g./dl.

After 72 hours of cultivation, the broth of *C. hydrocarboclastum* contained 3.18 g./dl. glutamic acid corresponding to a conversion of the suberic acid at a rate of 64%. Only 1.60 g./dl. glutamic acid could be found in the broth of R–7, although a much smaller amount of penicillin had been added.

The results described above with reference to strains of *Cornebacterium hydrocarboclastum* were substantially duplicated with the parent strains and the corresponding penicillin-resisting strains of *Brevibacterium ketoglutamicum* and *Arthrobacter paraffineus* mentioned above.

EXAMPLE 8

In a procedure analogous to that of Example 1, *Brevibacterium ketoglutamicum* S–10, *Arthrobacter paraffineus* S–4 and the parent strains of these mutant strains were cultured in place of *Corynebacterium hydrocarboclastus*, whereupon 100 u./ml. and 20 u./ml. penicillin G were added to the media respectively inoculated with the mutant strains and the parent strains. The results are shown in Table 4.

TABLE 4

| | Glutamic acid g./dl. |
|---|---|
| S–10 | 3.17 |
| The parent strain of S–10 | 1.08 |
| S–4 | 4.90 |
| The parent strain of S–4 | 1.62 |

We claim:
1. A method of producing L-glutamic acid by fermentation which comprises culturing an artificially induced mutant strain of a parent strain of the genus Brevibacterium, Corynebacterium, or Arthrobacter under aerobic conditions on a fermentation medium containing a source of assimilable carbon, a source of assimilable nitrogen, minor growth promoting nutrients, and an amount of a substance having penicillin activity sufficient to inhibit but not to prevent the growth of said mutant strain until a substantial amount of L-glutamic acid is accumulated in said medium, and recovering said glutamic acid, said source of assimilable carbon being a hydrocarbon or a carboxylic acid derivative of said hydrocarbon, said parent strain being capable of assimilating said carbon source and producing said glutamic acid in the absence of said substance, and said mutant being capable of growth on an agar nutrient medium containing said substance in an amount corresponding to more than 5 penicillin units per milliliter.

2. A method as set forth in claim 1, wherein said mutant strain is *Brevibacterium ketoglutamicum* ATCC 21533.

3. A method as set forth in claim 1, wherein said mutant strain is *Corynebacterium hydrocarboclastus* ATCC 21534.

4. A method as set forth in claim 1, wherein said mutant strain is *Arthrobacter paraffineus* ATCC 21535.

5. A method as set forth in claim 1, wherein said amount of said substance corresponds to 50 to 500 penicillin units per milliliter of said medium.

6. A method as set forth in claim 1, wherein said mutant strain is capable of growth on an agar nutrient medium containing said substance in an amount corresponding to 10 to 30 penicillin units per milliliter.

7. A method as set forth in claim 1, wherein said substance is a member of the group consisting of benzylpenicillin, α-phenoxyethylpenicillin, phenoxymethylpenicillin, α-phenoxypropylpenicillin, 5-methyl-3-phenyl-4-isoxazolylpenicillin, and α-aminobenzylpenicillin, or a sodium, potassium, or calcium salt of said member.

8. A method as set forth in claim 1, wherein said source of assimilable carbon is an alkane having a straight chain of six to twenty carbon atoms.

9. A method as set forth in claim 1, wherein said source of assimilable carbon is a monocarboxylic or dicarboxylic acid having a straight chain of 5 to 20 carbon atoms.

References Cited

UNITED STATES PATENTS

| 3,406,095 | 10/1968 | Otsuka et al. | 195—28 R |
| 3,511,752 | 5/1970 | Tanaka et al. | 195—28 R |

OTHER REFERENCES

Ikeda e al.: Agr. Biol. Chem., vol. 33, p. 1042-46, 1969.

A. LOUIS MONACELL,, Primary Examiner

G. M. NATH, Assistant Examiner

U.S. Cl. X.R.

195—30